SAMUEL ROCKAFELLOW.
Improvement in Horse Hay Rakes.
No. 122,282. Patented Dec. 26, 1871.
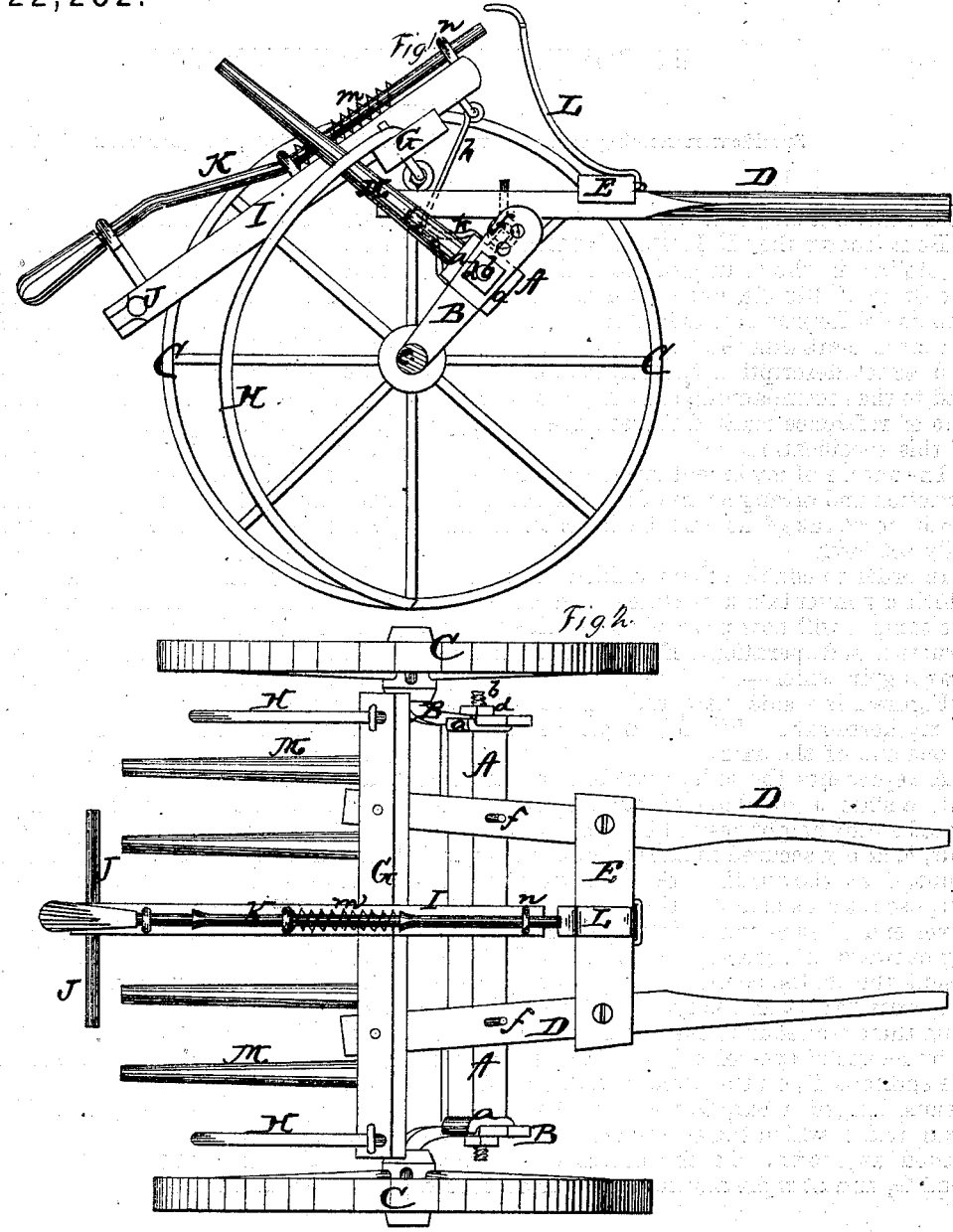
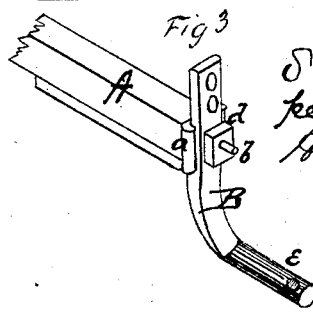

UNITED STATES PATENT OFFICE.

SAMUEL ROCKAFELLOW, OF MOLINE, ILLINOIS.

IMPROVEMENT IN HORSE HAY-RAKES.

Specification forming part of Letters Patent No. 122,282, dated December 26, 1871.

*To all whom it may concern:*

Be it known that I, SAMUEL ROCKAFELLOW, of Moline, in the county of Rock Island and in the State of Illinois, have invented certain new and useful Improvements in Horse-Rake; and do hereby declare that the following is a full, clear, and exact description thereof, reference being had to the accompanying drawing and to the letters of reference marked thereon making a part of this specification.

The nature of my invention consists in the construction and arrangement of a "walking spring-tooth horse-rake," as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a plan view of my horse-rake. Fig. 3 is a perspective view of one end of the axle.

A represents the axle, provided on each end with a slide, $a$, in which an arm, B, may be adjusted at any height desired by means of a screw-bolt, $b$, firmly secured in the end of the axle, and a nut, $d$, as shown, the arm B having for this purpose a series of holes through it. Upon the lower end of each arm B is a spindle, $e$, extending outward to receive the wheel C. D D represent the shafts, connected together by means of a cross-bar, E, and hinged a suitable distance from their rear ends to the upper side of the axle A by means of eye-bolts $ff$. To the rear ends of the shafts D D, on the upper side, is, by similar means, hinged a bar, G, which forms the rake-head, and to which the spring-teeth H H are attached, as shown. To the center of the rake-head G, and at right angles with it, is secured a bar, I, having handles J attached at their rear ends. The front end of the bar I is, by a rod, $h$, connected with a short bar, $k$, extending toward the rear from the center of the axle A. On the top of the bar I is located a rod, K, which is thrown forward by means of a spring, $m$, through a guide-loop, $n$, and into a spring-catch, L, attached to the cross-bar E, whereby the rake is held in proper position for work. The rod K is at its rear end provided with a suitable handle, so that the operator can readily withdraw the same from the catch L and unload the rake. M M are clearers, attached to the axle A and pointing toward the rear from the same.

The operator walks behind this rake to operate the same. When the rake is raised by the operator, it will be noticed that the axle is turned toward the rear, depressing the clearers M M, whereby the rake is so much more easily cleaned from its load.

Having thus fully described my invention, what I claim as new, and desire to secure by Letters Patent, is—

1. The combination of the axle A with clearers M, shafts D D hinged upon the axle, rake-head G hinged upon the shafts, and rod $h$ connecting the rake-head and axle, when constructed and arranged to operate substantially as and for the purposes herein set forth.

2. The combination, with the above, of the locking-rod K, spring $m$, and catch L, substantially as and for the purposes herein set forth.

In testimony that I claim the foregoing I have hereunto set my hand this 1st day of August, 1871.

SAMUEL ROCKAFELLOW.

Witnesses:
J. T. BROWNING,
W. R. MORSE.

(77)